United States Patent
Katoh et al.

(10) Patent No.: US 6,964,462 B2
(45) Date of Patent: Nov. 15, 2005

(54) RUBBER CRAWLER

(75) Inventors: Yusaku Katoh, Fukuyama (JP); Tsuyoshi Uchiyama, Fukuyama (JP)

(73) Assignee: Fukuyama Gomu Kogyo Kabushiki Gaishi, Fukuyama (JP)

( * ) Notice: Subject to any disclaimer, the term of this patent is extended or adjusted under 35 U.S.C. 154(b) by 0 days.

(21) Appl. No.: 10/296,393

(22) PCT Filed: May 23, 2001

(86) PCT No.: PCT/JP01/04342

§ 371 (c)(1),
(2), (4) Date: Nov. 25, 2002

(87) PCT Pub. No.: WO01/89914

PCT Pub. Date: Nov. 29, 2001

(65) Prior Publication Data

US 2003/0107267 A1 Jun. 12, 2003

(30) Foreign Application Priority Data

May 25, 2000 (JP) .......... 2000-154676

(51) Int. Cl.⁷ .......... B62D 55/24; F16G 1/00
(52) U.S. Cl. .......... 305/167; 305/170; 305/171
(58) Field of Search .......... 305/165, 167, 305/169–171, 173, 176, 172, 174, 175, 177, 182, 183, 166

(56) References Cited

U.S. PATENT DOCUMENTS

| | | | | |
|---|---|---|---|---|
| 1,612,024 A | * | 12/1926 | Jacobs | 305/170 |
| 3,582,154 A | * | 6/1971 | Russ, Sr. | 305/166 |
| 4,474,414 A | * | 10/1984 | Tokue | 305/168 |
| 5,522,654 A | * | 6/1996 | Katoh | 305/174 |
| 6,203,125 B1 | * | 3/2001 | Arakawa et al. | 305/166 |
| 6,523,915 B1 | * | 2/2003 | Matsuo | 305/167 |
| 2002/0163252 A1 | * | 11/2002 | Tsuru | 305/167 |
| 2004/0104621 A1 | * | 6/2004 | Tsuru | 305/167 |
| 2004/0224118 A1 | * | 11/2004 | Tsuru | 428/58 |

FOREIGN PATENT DOCUMENTS

| | | | | |
|---|---|---|---|---|
| JP | 92323/1976 | | 1/1978 | |
| JP | 54-3737 A | * | 1/1979 | 305/167 |
| JP | 354003737 A | * | 1/1979 | 305/177 |
| JP | 356167568 A | * | 12/1981 | 305/167 |
| JP | 3-295776 A | * | 12/1991 | 305/170 |
| JP | 403295776 A | * | 12/1991 | 305/170 |
| JP | 4-283180 A | * | 10/1992 | 305/170 |
| JP | 2000-33657 A | | 2/2000 | |

* cited by examiner

*Primary Examiner*—Russell D. Stormer
*Assistant Examiner*—Jason R. Bellinger
(74) *Attorney, Agent, or Firm*—Merek, Blackmon & Voorhees, LLC

(57) ABSTRACT

A rubber crawler includes parallel embedded tensile strength bodies, with each of tensile strength bodies being connected by butt portions. The butt portions of adjacent tensile strength bodies are longitudinally shifted relative to one another in a circumferential direction of the rubber crawler, and at least 75% of the butt portions are positioned on planes of projection of the core bars.

10 Claims, 18 Drawing Sheets

FIG. 35

| A MEANS OF A RUBBER CRAWLER | | A CONVENTIONAL METHOD (AN OVERLAPPING METHOD) | THE INVENTION (A SHIFT LAPPING METHOD) |
|---|---|---|---|
| WIDTH (mm) <br> LINK PITCH (mm) <br> THE NUMBER OF LINKS | | 200 <br> 72 <br> 38 | 200 <br> 72 <br> 38 |
| TENSILE STRENGTH BODY <br> DIAMETER THEREOF (MM) <br> THE NUMBER EMBEDDED | | STEEL CODE <br> 2.3 <br> 10 PIECES X 2 ROWS (20PIECES) | STEEL CODE <br> 2.3 <br> 10 PIECES X 2 ROWS (20PIECES) |
| AN OVERLAPPING LENGTH Lo <br> A SHIFT LAPPING LENGTH Ls | | 325 <br> - | - <br> 270~415 <br> (AVERAGE: 353) |
| TEST RESULT | | A CONVENTIONAL METHOD | THE INVENTION |
| BENDING FREQUENCY | TENSION FREQUENCY | 165 MM PEELING (STOP TESTING) | NORMAL |
| 560,000 | 970,000 | | |
| 5,720,000 | 9,880,000 | | NORMAL |

RUBBER CRAWLER

TECHNICAL FIELDS

The present invention relates to a rubber crawler which is mounted on an endless tread traveling device, such as an agricultural working vehicle, a civil engineering machine, a construction machine or a transportation vehicle, and especially to an improvement of a connecting section of a tensile strength body embedded therein.

PRIOR ART

A rubber crawler has been used for a traveling device of various self-running type move machines, such as agricultural working vehicles, civil engineering machines, construction machines and transportation vehicles.

As shown in FIGS. 28 and 29, the conventional rubber crawler is defined by metallic core bars embedded in a rubber crawler 17 at regular intervals along a circumferential direction of the rubber crawler and pluralities of tensile strength bodies (usually, steel cords 21 are used) arranged and embedded on the tread side (the outer peripheral side) of the core bars along the circumferential direction of the rubber crawler. Here, FIG. 28 is a perspective view showing an example of the conventional rubber crawler. FIG. 29 is a perspective view in an important part section showing the example of the conventional rubber crawler, and 22 is a departure-preventing guide and 20 is a lug.

Usually, ground on which an agricultural working vehicle (such as a combined harvester or a tractor), an agricultural transportation vehicle and a snow vehicle run is made of clay-like soil or snow, and is comparatively flat. Therefore, in the rubber crawler used for these working vehicles, connecting sections of the tensile strength bodies embedded therein rarely damage.

Besides, since civil engineering machines or construction machines, such as mini shovels or power shovels, run on irregular ground, earth and sand, gravel, etc. bite into the traveling device. Therefore, unusual tension and big driving force occur to the rubber crawler frequently, and the connecting sections of the tensile strength bodies of the rubber crawler are sometimes damaged. However, since the mini shovel or the power shovel is a machine whose main work is digging, this matter has rarely caused serious trouble up to the present.

Moreover, though a transportation vehicle, such as a dump truck, mainly runs on coarse roads, such as irregular ground, it only moves along such roads. Therefore, since earth and sand, gravel, etc. do not bite into the traveling device, trouble rarely occurs in the connecting sections of the tensile strength bodies of the conventional rubber crawler.

However, though a skid-steer or a bulldozer is a machine for working in places similar to a transportation vehicle, they are used for pushing the earth and sand or scooping up them, and therefore they need big driving force. Besides, since they frequently run inside earth and sand or gravel in a zigzag, earth and sand easily bite into the travelling device, as well as the mini shovel or the power shovel. Accordingly, since the connecting sections of the tensile strength bodies of the rubber crawler are damaged in many cases, trouble is caused. The trouble occurs especially in the travelling device, with a sprocket or an idler or a rolling-wheel with a small diameter. Besides, the troubles sometimes occur occurs in a travelling device without an idler-spring, even the mini shovel.

Up to this time, a steel cord is most generally used as a tensile strength body. The most popular connecting technique of steel cords is an end overlapping method (superposition method).

FIGS. 30 to 32 show the connecting section of the rubber crawler by the conventional end overlapping method, respectively. FIG. 30 is an important part perspective view. FIG. 31 is a sectional view taken on line X—X in FIG. 30, and FIG. 32 is a sectional view taken on line Y—Y in FIG. 30. Pluralities of steel cords 21 are arranged in a belt-shaped, pile up with their ends overlapping each other, and are connected through an adhesive rubber layer 23.

FIG. 33 is a schematic view showing a forming step in which a rubber crawler is connected, and FIG. 34 is a sectional view showing the state inside a connecting form mold.

Usually, in order to manufacture an endless rubber crawler, first of all a long belt-shaped main body is formed by vulcanizing uncured rubber, core bars and steel cords with a press mold so that the steel cords extend from both ends of the main body. Then, the core bars and the uncured rubber are inserted into a press mold for connecting by piling up steel cord layers comprising pluralities of steel cords in a belt-shape, and vulcanization molding is carried out. Thus, a rubber crawler is formed.

The overlapping length $L_0$ of a steel cord (superposition of a rubber crawler thickness direction) is usually determined by the following calculation by choosing necessary abilities suitably.

A shearing breaking load ($F_0$) of an overlapping section of a steel cord is expressed with Formula 1, wherein an overlapping length of a steel cord is $L_0$ [mm], a width of a steel cord row is h [mm], a shearing breaking load per unit area is $f_0$ [N/mm$^2$], and the shearing breaking load of a connecting section is $F_0$ [N].

$$F_0 = L_0 \times h \times f_0 \qquad \text{Formula 1:}$$

However, usually, since a safety factor is taken into consideration, the overlapping length in the conventional rubber crawler is calculated with Formula 2. The safety factor is S, and the breaking strength of a steel cord is $F_1$.

$$L_0 > F_1 \times S/(h \times f_0) \qquad \text{Formula 2:}$$

However, while a connection by the end overlapping method has a very convenient workability and a good efficiency, there are limits in improving the possible running time by improving the durability of the connecting section of a steel cord, even if the overlapping length thereof is lengthened. Besides, its use is also restricted.

As shown in FIGS. 30 to 32, the overlapping section of a steel cord (in which the opposite ends of the steel cords are piled up) of the rubber crawler is formed so as to hold adhesive rubber between two layers of steel cords. When the overlapping section coils around the idler or the sprocket of the driving device, the steel cords of the outer circumferential side (tread side) of two layers can not coil smoothly unless they are longer than the cords of the inner circumferential side (rolling wheel side). However, since steel cords hardly extend and are hardly compressible, the adhesive rubber layer between the steel cords is converted and wound around. Therefore, shearing deformation occurs in the adhesive rubber at the opposite ends of the steel cords of the outer circumferential side or the inner circumferential side of the overlapping section.

Accordingly, in addition to the tension imposed on the steel cords from the beginning, unusual tension caused by insertion of foreign materials or by accumulation of earth and sand is imposed on the overlapping section of the steel cords in the connecting section of the rubber crawler, and the shearing deformation occurs in the adhesive rubber layer between the overlapped steel cords. Besides, when the overlapping section coils around the idler or the sprocket, the shearing force is repeatedly imposed on the adhesive rubber layer at the ends of the overlapping sections, thereby causing the shearing deformation. Therefore, since the adhesive rubber layer of the connecting section is gradually destroyed from the ends of the steel cords, the durability of the rubber crawler decreases remarkably.

The above-mentioned problems are taken up in an official gazette of Japanese Patent Provisional Publication No. 109948/1997. Though countermeasures proposed therein improve an effect fairly, they are not necessarily the wisest measures.

Besides, as another method, a method for winding the steel cords endlessly is proposed in an official gazette of Japanese Patent Provisional Publication No. 1179731/1999.

However, though the connecting section is not destroyed in this method, a special endless rolling device is required. This device must be mounted on every product with a different circumference of rubber crawler. Besides, in the vulcanization process, a conventional manufacturing method, that the majority of rubber crawler is vulcanized and formed with a long press and the ends thereof are connected to each other by the overlapping method, can not be carried out. At least 5 to 6 cycles of molding vulcanization are needed. Therefore, the productive efficiency becomes very bad. Moreover, in order to vulcanize it at one time, a very expensive molding vulcanizer is needed.

Furthermore, there is another method, wherein the steel cords are classified into pluralities of steel cord rows, and the steel cord rows extending from the opposite ends are connected with each other on the core bars so that the classified steel cord groups may be abutted in a zigzag. However, according to this connection, in case of not lengthening each length of the steel cords, sufficient pulling strength can not be obtained. Therefore, the steel cords will be pull away. To solve this problem, a proposal that a shortage of pulling strength be improved by embedding the second steel cord rows in butt connecting sections is disclosed in the official gazette for for Japanese Patent Provisional Publication No. 295776/1991. In addition, a proposal for improving a shortage of pulling strength by adjusting the core bars to the butt portions, embedding rectangular auxiliary plates in a rubber elastic body and connecting these is disclosed in the official gazette for Japanese Patent Provisional Publication No. 283180/1992.

However, these proposals are not always throughgoing measures to durability of the connecting section.

As another connecting method, there is a mutual plug method. In the plug method, the tensile strength bodies on one side are inserted between the tensile strength bodies on the other side one by one and the tensile strength bodies of the two sides are connected to each other, forming an endless form.

However, since the workability of this method during manufacturing is poor and the hours required for it are long, there is a problem that the manufacturing cost is high. Besides, there is a problem in the arranging or shaping of the rubber crawler that the width of a row of the tensile strength bodies of the connecting section becomes broad compared with other places in a widthwise direction of the rubber crawler. Accordingly, this connecting method is hardly used at present.

SUMMARY OF THE INVENTION

The present invention aims to solve the above-mentioned problems, and uses the following configuration.

Pluralities of tensile strength bodies are parallel, arranged in a row widthwise of a rubber crawler along a circumferential direction of the rubber crawler, and embedded in a rubber elastic body forming the rubber crawler as tensile strength body rows. In this case, front edges of the opposite ends of the tensile strength bodies are abutted against each other and connected together into an endless form. The tensile strength bodies are embedded and arranged so that positions of butt portions of adjoining tensile strength bodies are shifted longitudinally circumferentially of the rubber crawler with respect to one another.

BRIEF DESCRIPTION OF THE DRAWINGS

FIG. 35 is a table comparing test results of rubber crawlers used in a flexing fatigue test.

DETAILED DESCRIPTION OF THE PREFERRED EMBODIMENT

Figure 1:
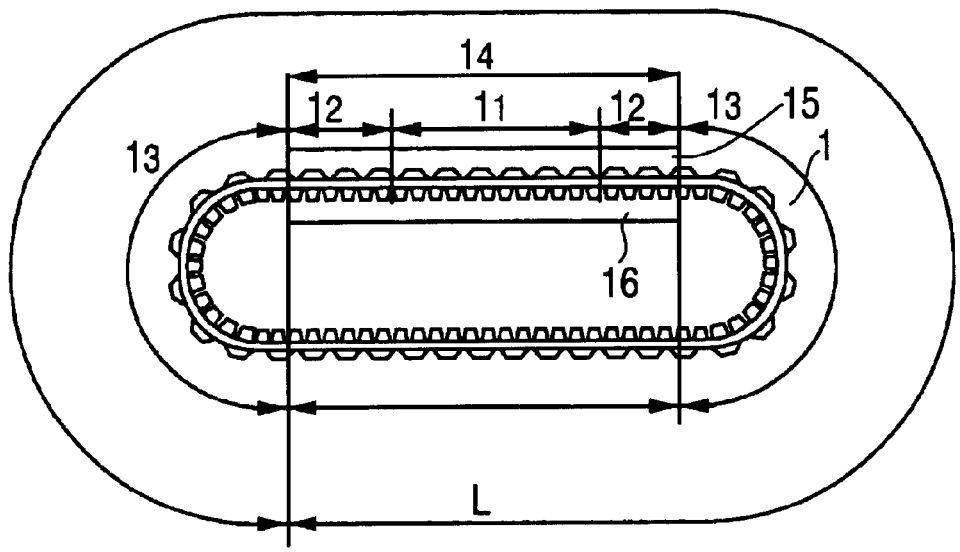
FIG. 1 is an explanatory view showing the relation between the circumference of a rubber crawler and the length of a connecting section.

The configuration of a rubber crawler of the present invention is as follows. Pluralities of tensile strength bodies are parallel, arranged in a row widthwise of the rubber crawler along the circumferential direction of the rubber crawler, and embedded in a rubber elastic body. In this case, front edges of the opposite ends of the individual tensile strength bodies are abutted against each other and connected together into an endless form. The front ends of the tensile strength bodies overlap each other so that the positions of the butt portions of adjoining tensile strength bodies are shifted with respect to one another longitudinally circumferentially of the rubber crawler. According to this, the rubber crawler can achieve a pulling strength sufficient to bear the driving force of a traveling device and a certain amount of unusual load.

The positions of the butt portions of the front edges of both ends of the adjoining tensile strength bodies are preferably shifted so that the pulling strength of each tensile strength body corresponds to tensile strength thereof. And the pulling strength and the tensile strength of the tensile strength bodies are made sufficient to bear the driving force of the traveling device and a certain amount of unusual load.

Then, the position of the butt portion of a single tensile strength body and the positions of the butt portions of its adjoining tensile strength bodies are shifted relative to one another along the circumferential direction of the rubber crawler. In the adjoining tensile strength bodies, it is preferable that a shift lapping length, the length by which one tensile strength body extending from one side of the circumferential direction of the rubber crawler overlaps with an adjoining tensile strength body extending from the other side, is more than the length satisfying the relation that the pulling strength corresponds to the tensile strength. However, what is necessary is just to make total shift lapping length into what can obtain a total pulling strength satisfying the relational expression shown in Formula 3. Here, Formula 3 shows that a total pulling strength PS of the tensile strength bodies whose opposite front ends are parallel and arranged in a row widthwise of the rubber crawler and overlap each other becomes 80% or more of the total tensile strength of all of the tensile strength bodies arranged in a row minus the number CN of the butt portions positioned within an interval between adjacent core bars. There is no problem even if amounts of the tensile strength and the pulling strength get mixed up in a part of tensile strength bodies. Here, Tb is the tensile strength of a single tensile strength body.

$$PS \geq (TN-CN)Tb \times 0.8 \qquad \text{Formula 3:}$$

Since the front edges of the opposite ends of the tensile strength bodies are abutted, in a sprocket (driving wheel) and an idler (compensating wheel) winding section, there is no place between the tensile strength bodies to cause such big shearing deformation as occurs in the connecting section made according to the conventional end overlapping method. Besides, the positions of the butt portions of the adjoining tensile strength bodies are shifted relative to one another in the circumferential direction of the rubber crawler, thereby enabling the shift lapping length so as to make the pulling strength sufficient to bear the driving force of the travelling device and a certain amount of unusual load. Thus, durability (fatigue resistance) against repeat curvatures in the sprocket and idler winding sections improves. Therefore, even in increased, unusual tension, the connecting sections of the tensile strength bodies are not easily destroyed. Besides, the durability of the connecting sections improves, thereby enabling a reliable rubber crawler to be formed.

Besides, it is preferable that all the tensile strength bodies are embedded in such an arrangement that the position of the butt portion of tensile strength body is shifted longitudinally circumferentially of the rubber crawler with respect to the positions of the butt portions of adjacent tensile strength bodies. However, even if 80% of such tensile strength bodies are so shifted, it is possible to obtain the pulling strength sufficient to bear the driving force of the travelling device and a certain amount of unusual load.

Moreover, it is preferable that the position of the butt portions of each tensile strength body is shifted circumferentially in the rubber crawler so as not to be in alignment with the positions of the butt portions of the other tensile strength bodies. In this case, all the butt portions are set at different positions in the width direction of the rubber crawler.

Since the butt portions of the tensile strength bodies are the most inferior portions in durability, the durability of the connecting sections is improved by not centralizing the portions with inferior durability in one place.

Figure 33:
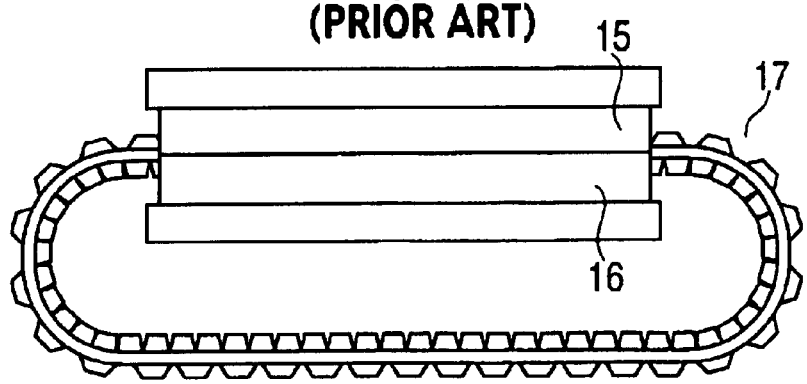
FIG. 33 is a schematic view showing a forming step to connect a rubber crawler in an endless form.
Figure 34:
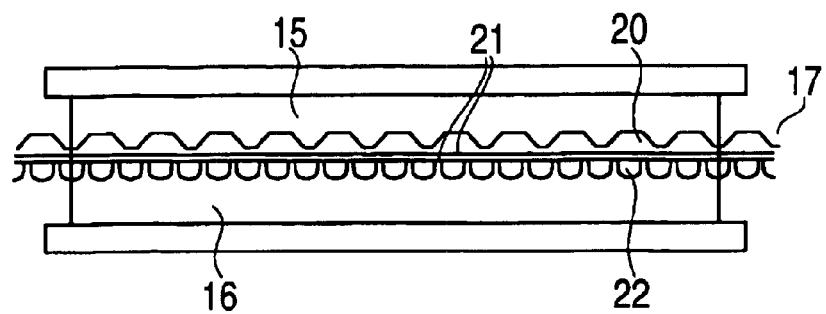
FIG. 34 is a sectional side view showing the inside of a connecting forming mold.

Usually, a rubber crawler is made into an endless form by using a press molding device or a press molding shown in FIG. 33.

FIG. 1 is an explanatory view showing the relation between the circumference of a rubber crawler and the length of a connecting section in a rubber crawler connecting process.

Numeral $1_1$ is the possible maximum length of a connecting section, and $1_2$ is the length of an end of a long main body of a rubber crawler inserted in a connecting mold to prevent an interval aberration. Numeral $1_3$ is the length of a bent portion of the long main body in connecting, in vulcanizing, and in molding. Numeral $1_4$ is the length of the connecting mold. Besides, 1 is a rubber crawler, 15 is an upper mold of the connecting mold, and 16 is a lower mold thereof.

The rubber crawler is correlated with the size (weight) of a machine in the circumference, the width, the thickness and the interval. Therefore, the length $1_2$ and the length $1_3$ are variables almost proportional to the circumference L of the rubber crawler except in a unique case.

Figure 2:
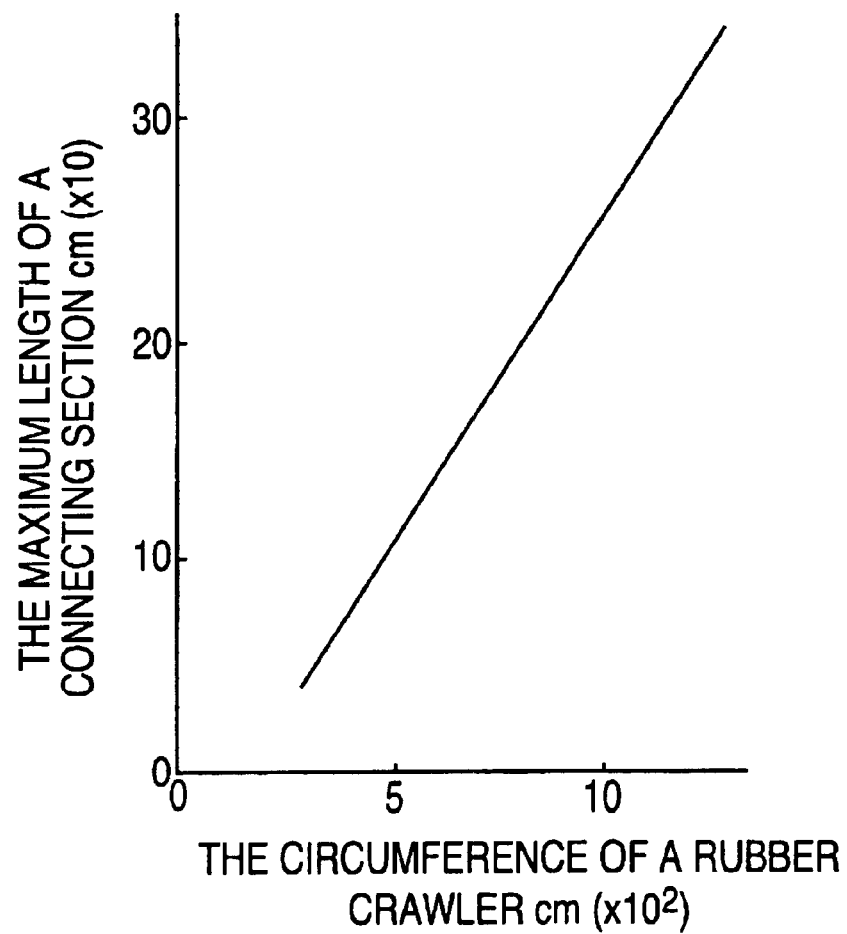
FIG. 2 is a graph showing the relation between the circumference of a rubber crawler and the maximum length of a connecting section.

FIG. 2 shows the relation between the circumference of an actual rubber crawler and the maximum length $1_1$, of a connecting section. The relation is expressed by Formula 4.

$$1_1 = 19L/64 - 470 \qquad \text{Formula 4:}$$

Accordingly, the maximum length $1_1$ of a connecting section of various rubber crawlers is restricted by the circumference L, as shown in FIG. 2 and Formula 3. Hence, the invention provides a durable connecting method in the restricted length.

Figure 3:
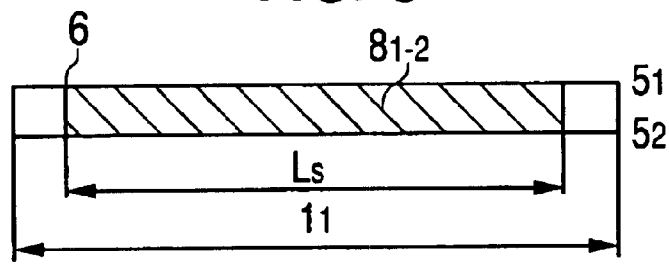
FIG. 3 is an explanatory view showing a basic pattern of one-shift lapping of high tensile strength bodies in a rubber crawler.
Figure 4:
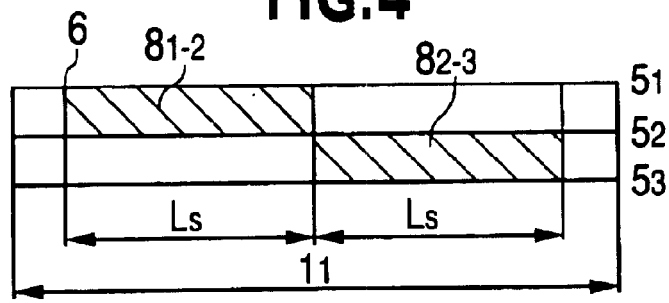
FIG. 4 is an explanatory view showing a basic pattern of two-shift lapping of high tensile strength bodies in a rubber crawler.
Figure 5:
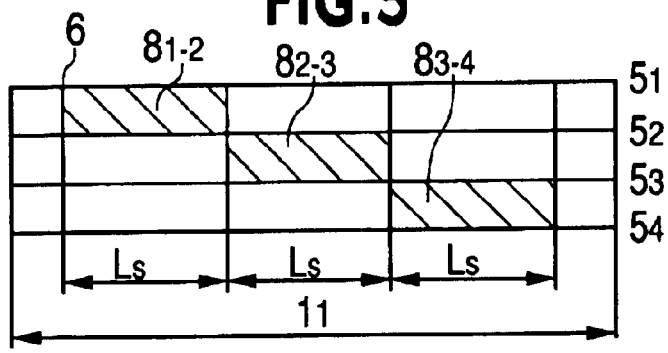
FIG. 5 is an explanatory view showing a basic pattern of three-shift lapping of high tensile strength bodies in a rubber crawler.
Figure 6:
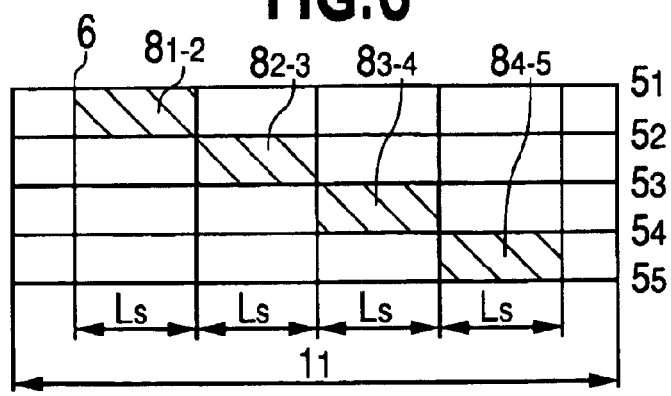
FIG. 6 is an explanatory view showing a basic pattern of four-shift lapping of high tensile strength bodies in a rubber crawler.

Representative examples of a basic pattern of the connecting method of the invention are shown in FIGS. 3 to 6, respectively. In these examples, each tensile strength body is a steel cord. FIG. 3 shows a basic pattern of one-shift lapping, FIG. 4 shows a basic pattern of two-shift lapping, FIG. 5 shows a basic pattern of three-shift lapping, and FIG. 6 shows a basic pattern of four-shift lapping. In the figures, $5_1$ to $5_5$ are steel cords, $8_{1-2}$ to $8_{4-5}$, are shift lapping portions between steel cords, 6 is a butt portion of the end of a steel cord, and $L_s$ is a shift lapping length.

In every basic pattern, shift lapping portions 8 share the load of the connecting section. In FIG. 3, one-shift lapping portion $8_{1-2}$ is constituted from two steel cords $5_1$ and $5_2$, and connecting efficiency thereof is one-half. In the pattern of FIG. 4, two-shift lapping portions $8_{1-2}$, $8_{2-3}$ are constituted from three steel cords $5_1$, $5_2$ and $5_3$, and connecting efficiency thereof two-thirds. It is three-fourths in FIG. 5, and four-fifths in FIG. 6, respectively.

Besides, in a practical rubber crawler, tensile strength bodies may be naturally arranged by using not only basic patterns but also deformation patterns, combination patterns, etc. It is possible to increase the connecting efficiency of each shift lapping method.

A shift lapping length ($L_s$) of a connecting section of an ideal tensile strength body (steel cord) is usually designed as follows.

Figure 7A:
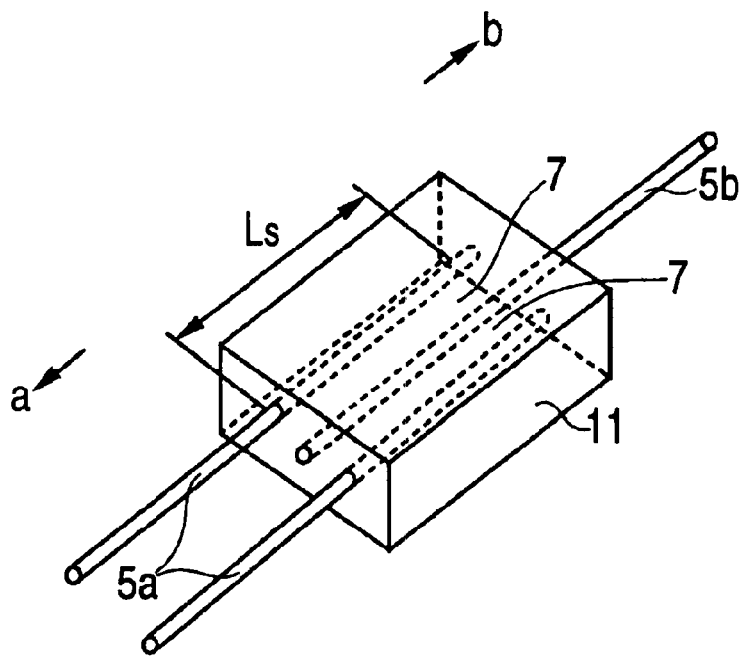
FIG. 7A is a perspective view of a test piece for testing pulling strength of steel cords.
Figure 7B:
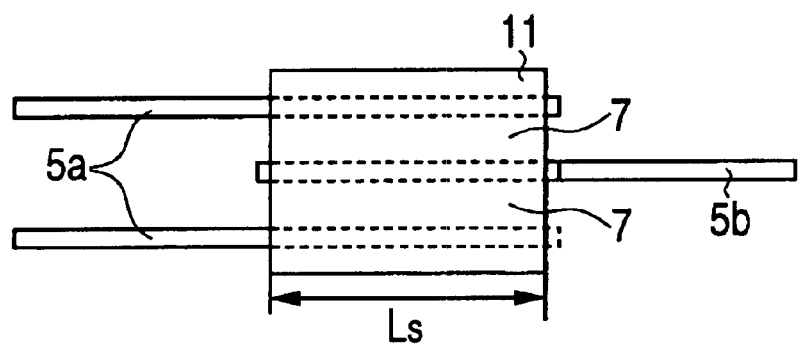
FIG. 7B is a plan view thereof.
Figure 7C:
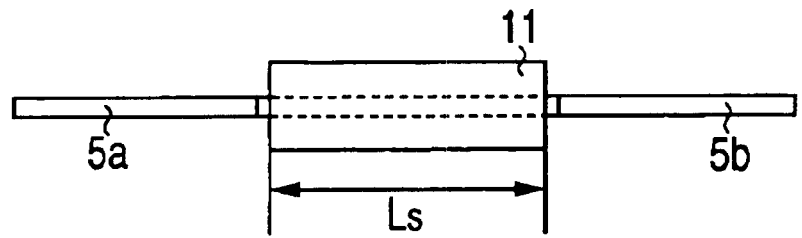
FIG. 7C is a side view thereof.

FIGS. 7A to 7C show a test piece 11 that examines the pulling strength of a steel cord. Here, the pulling strength has an intensity that two steel cords $5a$ in "a" direction are fixed, a steel cord $5b$ in "b" direction is pulled the direction of the arrow aligned with $5b$, and adhesive rubber 7 between the steel cords is destroyed. Thus, the steel cords come off.

The pulling strength per unit length of a specific steel cord, the shift lapping length thereof and the tensile (rupture) strength thereof are, respectively, $f_s$ [N/mm], $L_s$ [mm] and Tb [N]. When Formula 5 below is satisfied, the rubber portion is never damaged (the steel cord is never pulled) even if the steel cords rupture.

$$L_s \times f_s > Tb \qquad \text{Formula 5:}$$

The steel cords embedded in the rubber crawler transmit the driving force, which is received from the sprocket of the travelling device, to the core bars, and to the whole rubber crawler, thereby moving the main body of the machine. Besides, since the steel cords are bonded to the core bars through adhesive rubber, the driving force is transmitted from the core bars to each steel cord therethrough.

A rubber crawler is usually designed in consideration of conditions, such as the weight of a machine and the driving force of the travelling device. The shape and the size of a core bar are also designed similarly. Here, the steel cords receive unusual tension many times as much as the driving force simultaneously transmitted from the core bars to the whole rubber crawler. The unusual tension occurs because foreign materials bite in between the travelling device and the rubber crawler. Therefore, since the steel cords need arranging within the limited space between the core bars, an arrangement of the cords cannot avoid being dense.

When an arrangement of the steel cords becomes dense, the space between adjacent steel cords becomes narrow. Therefore, when pulling force is applied to the steel cords of the connecting section, a concentrated shearing force will be added to the adhesive rubber between the steel cords.

Figure 8:
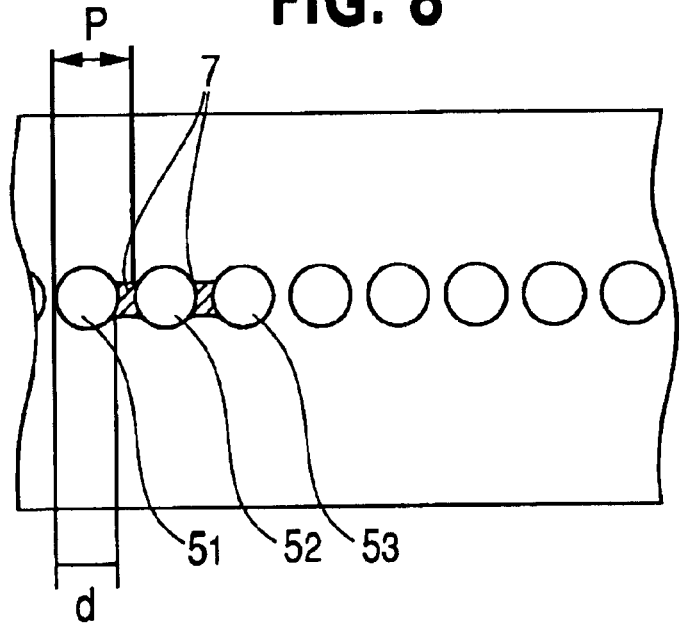
FIG. 8 is a partially sectional view of a rubber crawler for explaining an arrangement of steel cords.

FIG. 8 is a partial sectional view of a rubber crawler for explaining an arrangement of steel cords in the rubber crawler.

When an outer diameter and an arranged interval of steel cords are respectively "d" and P, P/d is about 1.1 to 1.5. When the steel cords $5_1$ and $5_3$ are pulled from the front of the figure and the steel cord $5_2$ is pulled from the back side of the figure, stress concentration occurs in adhesive rubber 7 between the steel cords $5_1$, $5_3$ and the steel cord $5_2$. Since rubber breaking begins at this place, the pulling strength becomes low compared with the case where the steel cords are arranged non-densely. Therefore, steel cords arranged densely need to lengthen their shift lapping length compared with the non-dense case.

Figure 9:
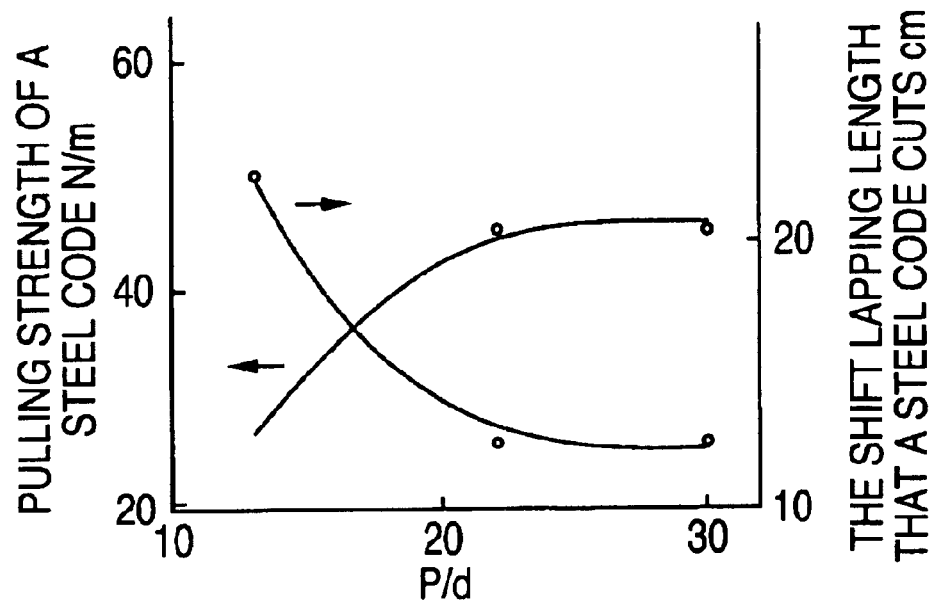
FIG. 9 is a graph showing the relation between p/d of a steel cord of Φ2.3 and pulling strength thereof, and between p/d and the length of a shift lapping at which the steel cord breaks.

FIG. 9 shows the relation between the pulling strength to P/d of a steel cord of 2.3 Φ and the shift lapping length at which the steel cord breaks.

The P/d ratio of an arrangement of steel cords in a general rubber crawler is 1.22 to 1.44. When P/d is 1.3, the steel cord breaks at 22 cm of a shift lapping length. On the other hand, in an arrangement in which P/d is more than 2.2, the steel cord breaks at 12.5 cm of a shift lapping length. Therefore, to obtain equal pulling strength, 1.8 times the shift lapping length is required.

Figure 10:
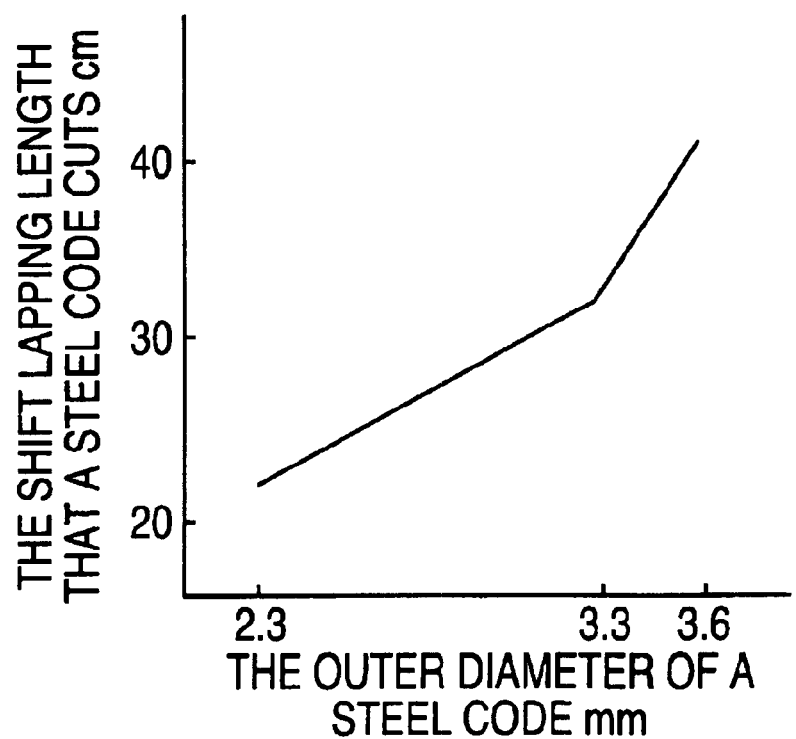
FIG. 10 is a graph showing the length of a shift lapping at which the pulling strength corresponding to the diameter of a steel cord becomes equivalent to the tensile strength thereof.

FIG. 10 shows the shift lapping length at which the pulling strength of a steel cord in an actual rubber crawler, depending on its diameter is equivalent to its tensile strength. When using a steel cord of 2.3 Φ, if the shift lapping length is 22 cm or more, the pulling strength is more than the tensile strength. However, since the length of a connecting section is restricted by the manufacture shown previously, the pulling strength is practically set to the intensity corresponding to the tensile strength, namely, 80% or more of the tensile strength. Here, an efficient connection can be secured.

Figure 11:
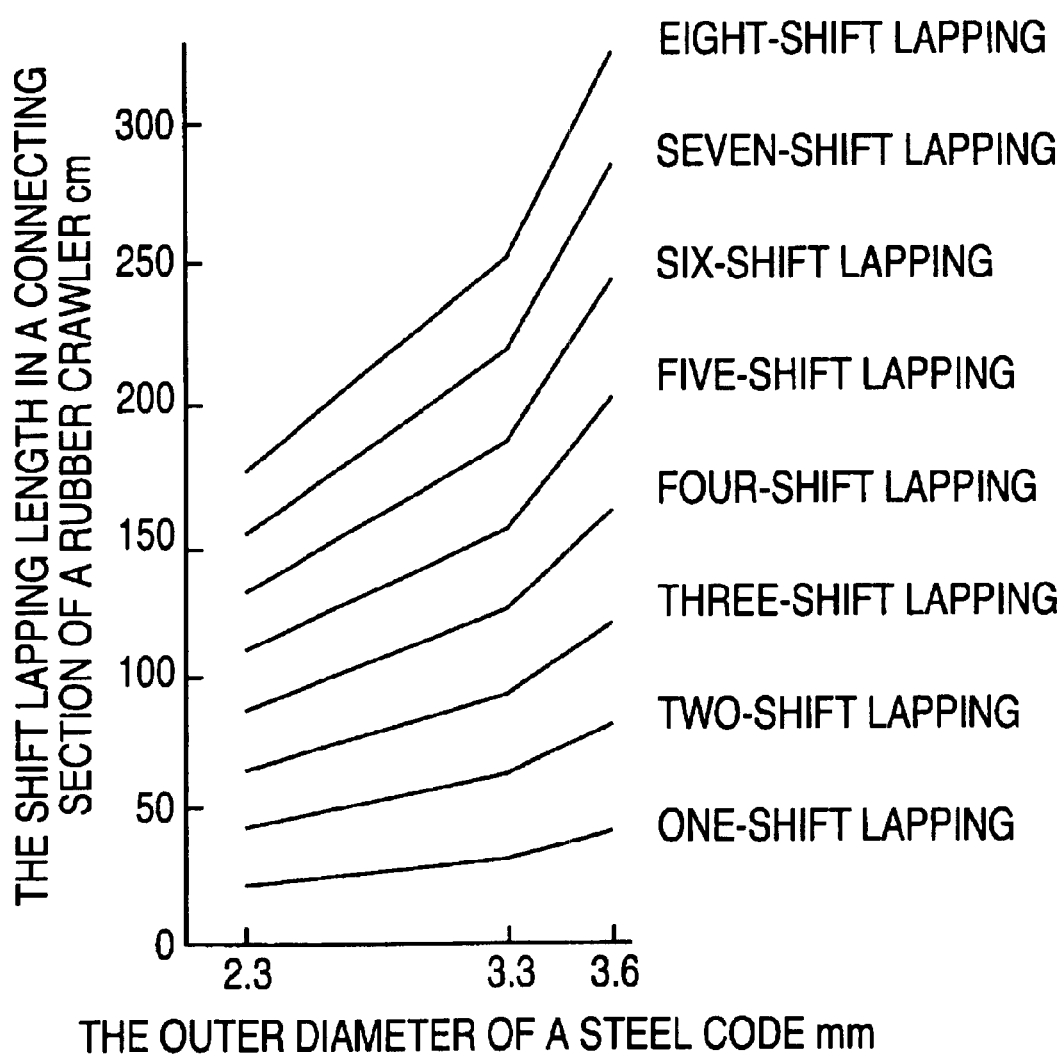
FIG. 11 is a graph showing the relation between the number of shift lappings corresponding to the diameter of a steel cord and the length of a connecting section of a rubber crawler.

FIG. 11 shows the relation between the number of shift lappings and the length of a connecting section of a rubber crawler, depending on the diameter of the steel cord. The possible number of shift lappings in the connecting section with the restricted length is usually 1 to 8.

It is preferable that the tensile strength bodies which do not have butt portions within a given interval between adjacent core bars in a connecting section are arranged among the tensile strength bodies forming butt portions within the given interval between core bars in the connecting section such that the number of tensile strength bodies having butt portions in the given interval is less than 25% of all the tensile strength bodies in the given interval. In this case, when there is a shortage of strength (for example, when 25% butt portions are between the core bars), it is necessary to increase the number of tensile strength bodies more than usual, or to raise the breaking strength (increasing the number of tensile strength bodies compensating 25% shortage of intensity or using the tensile strength bodies with the high breaking strength). However, increasing the number of tensile strength bodies excessively or using tensile strength bodies with high breaking (tensile) strength will cause manufacturing costs to go up. Accordingly, these measures are not so desirable.

In many cases, if the tensile strength bodies of the rubber crawler are broken by unusual tension, they usually break within the space between the adjoining core bars. However, if the number of tensile strength bodies not overlapping with the tensile strength bodies extending from the opposite direction of the rubber crawler within a core bar interval in the connecting section is made less than 25% of the number of all tensile strength bodies in the interval, the connecting section can improve in durability.

Besides, the shortage of strength within 25% can be compensated by increasing the tensile strength bodies or by using tensile strength bodies with high rupture (tensile) intensity.

In this case, a range that the tensile strength bodies not overlapping with the tensile strength bodies extending from the opposite direction of the circumferential direction of the rubber crawler of the adjoining tensile strength bodies are arranged so as to be less than 25% of the whole is within projections of two adjoining core bars in a direction perpendicular to the planes of the core bars. Besides, it is still desirable that the arrangement is carried out within a space between two adjoining core bars.

Moreover, the percentage of the tensile strength bodies having butt portions within the predetermined interval between the core bar and its adjoining core bar is set to 40% or less in the rubber crawler connecting section. It is still desirable that it is set to 34% or less.

Furthermore, it is desirable that it is set to 25% or less within a space where the core bars are not embedded.

As mentioned previously, since the site at which the tensile strength bodies usually break to a great extent when unusual tension is added to the rubber crawler exists between the adjoining core bars, durability is improved by restricting the number of butt portions of the tensile strength bodies between the adjoining core bars.

Moreover, it is preferable to arrange the positions of the butt portions of the tensile strength bodies in a projection of a lug or a core bar in a direction perpendicular to its core. According to this arrangement, there is no butt portion of a tensile strength body in bending sections of the rubber crawler or in thin fractions of the tread side. Besides, while using the rubber crawler, the ends of the tensile strength bodies are prevented from breaking and becoming exposed through the tread side of the rubber elastic body. Accordingly, the rubber crawler improves in durability.

Though a steel cord is generally used as a tensile strength body, Vinylon, Nylon, Tetron, Vectlan, Kevlar, etc. can be also used. Besides, it is not limited to these.

The rubber elastic body is made by the application of one or more reinforcing agents, such as carbon black, fillers, an antioxidant, a vulcanization accelerator, a curing agent, etc., suitably chosen and designed to natural rubber or synthetic rubber (SBR, BR, IR, urethane, etc.), or by suitably blending high polymer resin, such as high styrene resin, etc. to the natural or synthetic rubber, depending on the working conditions, required durability, the cost of the rubber crawler.

Here, the rubber elastic body used for the invention is not limited to these.

A so-called core-bar-less rubber crawler, as well as the conventional rubber crawler, can be used as the rubber crawler utilizing the connecting method of the tensile strength bodies of the invention. In the conventional rubber crawler, metallic core bars are made parallel and embedded in the rubber elastic body at a fixed interval along a circumferential direction of the crawler, and pluralities of tensile strength bodies are made parallel and embedded in the tread side (peripheral side) of the core bar, the tensile strength bodies being adjacent one another widthwise of the rubber crawler. The core-bar-less rubber crawler is one in which no metallic core bars are embedded, which is mainly used for a highspeed run.

EXAMPLE

An example of the invention is explained in detail using figures.

Figure 12:
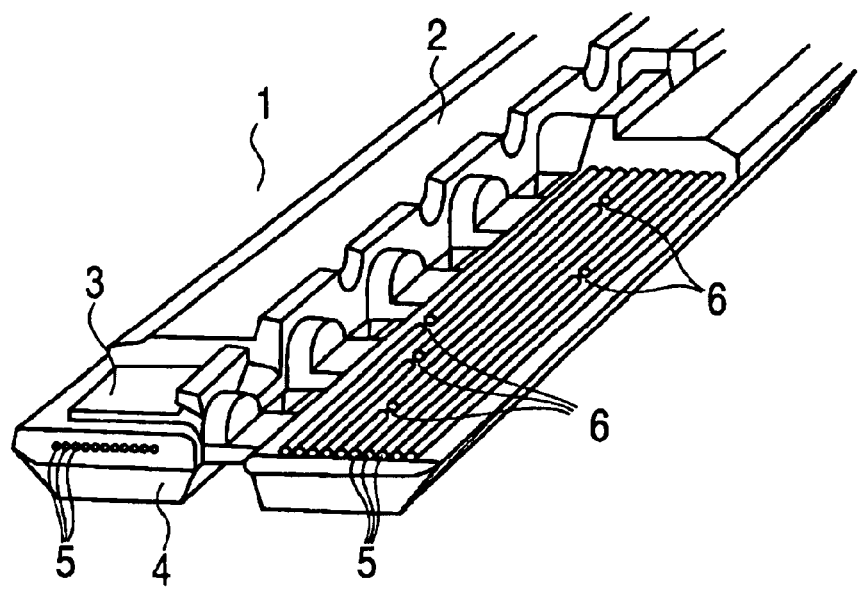
FIG. 12 is a partial plan view, with a portion removed, of a first example of the invention.
Figure 13:
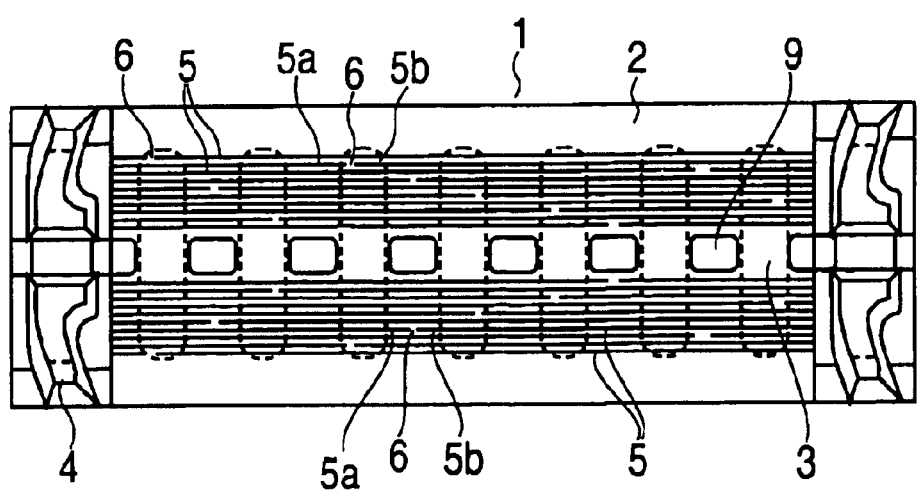
FIG. 13 is a partial plan view, with a portion removed, showing an arrangement of steel cords in the connecting section of the first example of the invention.
Figure 14:
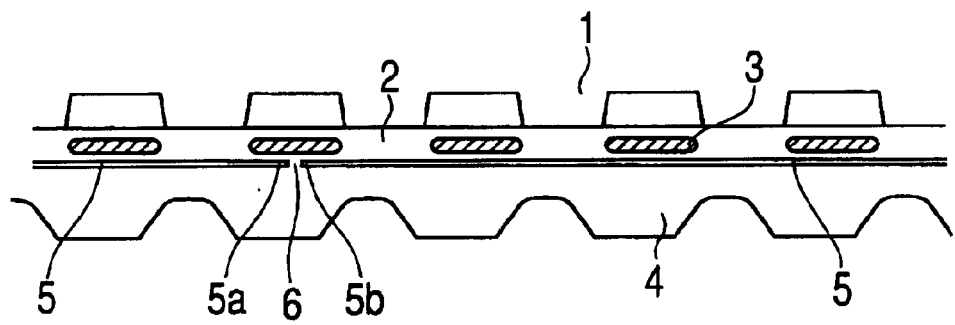
FIG. 14 is a sectional side view.
Figure 15:
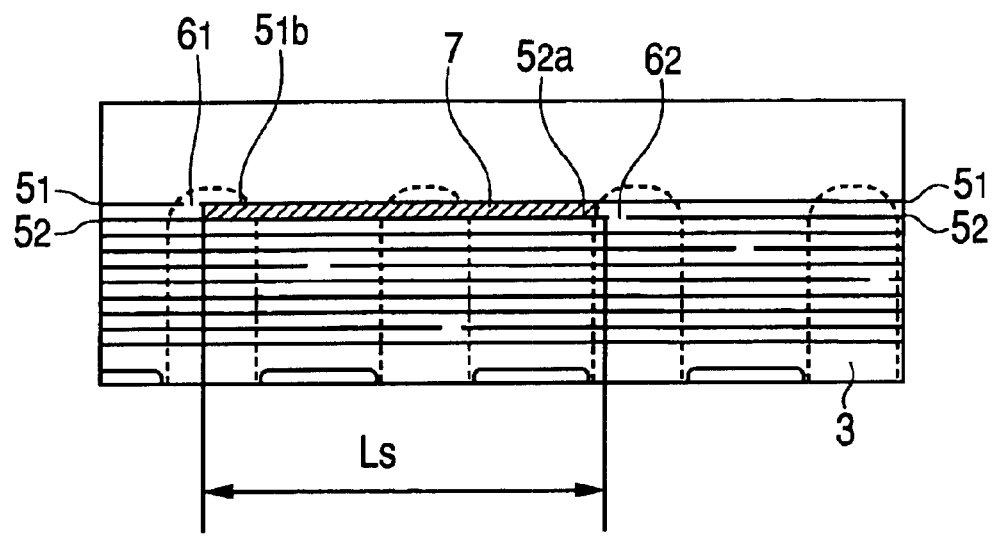
FIG. 15 is an enlarged view of an important part of the connecting section of FIG. 13.
Figure 16:
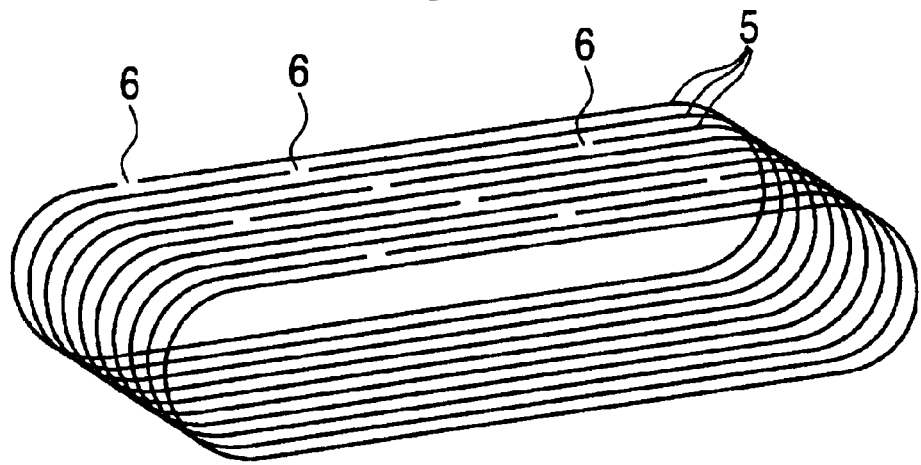
FIG. 16 is a perspective view showing how the tensile strength bodies are arranged inside a rubber crawler.

FIG. 12 is a partial view of first example of the invention, FIG. 13 is a partial plan view showing an arrangement of connecting sections, FIG. 14 is a sectional side view, and FIG. 15 is an enlarged view of an important part of FIG. 13. FIG. 16 is a perspective view showing tensile strength bodies arranged inside a rubber crawler.

A rubber crawler 1 of the first example comprises a rubber elastic body 2, metallic core bars 3, lugs 4 and pluralities of steel cords 5. The core bars 3 are embedded inside the rubber elastic body 2 at a fixed interval along a circumferential direction of the rubber crawler. The lugs 4 protrude on the tread side of the rubber crawler 1. The steel cords 5 are divided into two along engaging holes 9 in the middle of the rubber crawler 1 on the peripheral side (tread side) of the core bars 3, and made into two right and left steel cord rows parallel and arranged widthwise of the rubber crawler 1.

A connecting section of a steel cord 5 forms a butt portion 6 at which the opposite ends 5a, 5b of the steel cord 5 are abutted against each other. The positions of the butt portions 6 of adjoining steel cords 5 are shifted relative to one another along the circumferential direction of the rubber crawler 1.

In FIG. 15, the positions of the butt portions 61, 62 of the adjoining steel cords $5_1$, $5_2$ are shifted along the circumferential direction. The end $5_1b$ of the steel cord $5_1$ and the end $5_2a$ of the steel cord $5_2$ overlap each other along the circumferential direction, and are bonded thru the adhesive rubber 7. In this case, the length from the position of the butt portion $6_1$ of the steel cord $5_1$ to the position of the butt portion $6_2$ of the steel cord $5_2$ is the shift lapping length $L_S$. The shift lapping length $L_S$ is designed by using Formula 3 for the working conditions of the rubber crawler 1 or design conditions like durability so that the pulling strength may be set to a value corresponding to the rupture strength of the steel cord 5 or more than it.

Here, this example is an example of a combination arrangement with two-shift lapping.

Figure 17:
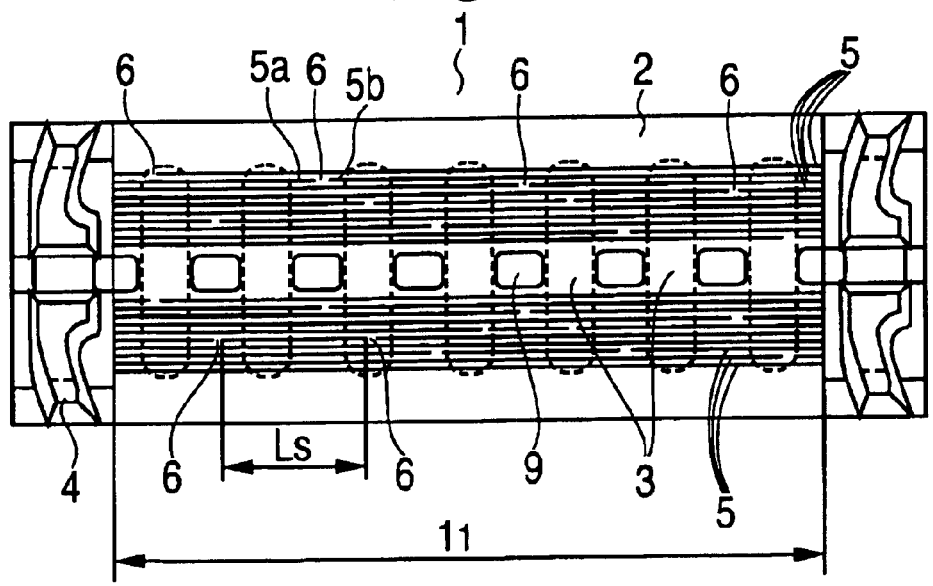
FIG. 17 is a partial plan view, with a portion removed, of a second example of the invention.

FIG. 17 is a partial plan view showing an arrangement of the butt portions 6 of the connecting section of the steel cords 5 of the second example of the invention. Relative to each position of the butt portions 6 of the individual steel cords 5, the positions of the butt portions 6 of the other steel cords 5 are shifted longitudinally circumferentially of the rubber crawler 1, and arranged so as not to be in alignment. This example is an example of a combination arrangement with three-shift lapping.

The circumference L of the rubber crawler 1 of this example is 5112 mm, and the length $1_1$ of the connecting section is 994 mm. An outer diameter "d" of the steel cord 5 is 2.3 mm, and tensile strength Tb is 5256 N. Since per-unit pulling strength is 27 N/mm and the shift lapping length $L_S$ is 225 mm, pulling strength $f_S$ is 6075 N. Therefore, the pulling strength is more than the tensile strength. In ten steel cords 5 in one side of steel cord rows sandwiching engaging holes 9, there are seven overlapping parts in which the adjoining right and left steel cords 5 overlap with the steel cords 5 extending from the opposite direction of the circumferential direction of the rubber crawler 1 (when one steel cord 5 overlaps with the adjoining right and left steel cords 5 simultaneously, since connecting efficiency is set to 1, the overlapping part is calculated to be one). Hence, the total pulling strength is 7×6075=42525 N. Besides, the number of the butt portions 6 within the predetermined interval of core bars with most butt portions is two. Hence, the total tensile strength is (10−2)×5256=42048 N. Therefore, the total pulling strength is more than the total tensile strength.

Figure 18:
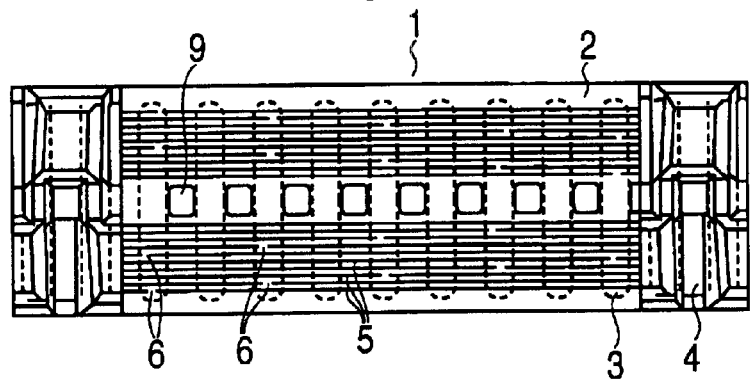
FIG. 18 is a partial plan view, with a portion removed, of a third example of the invention.

FIG. 18 is a partial plan view showing an arrangement of the butt portions 6 of the connecting section of the steel cords 5 of the third example of the invention. The positions of the butt portions 6 of the steel cords 5 are arranged within a plane of projection of the lug 4 or within a plane of projection of the core bar 3.

This example is an example of a combination arrangement with four-shift lapping.

Figure 19:
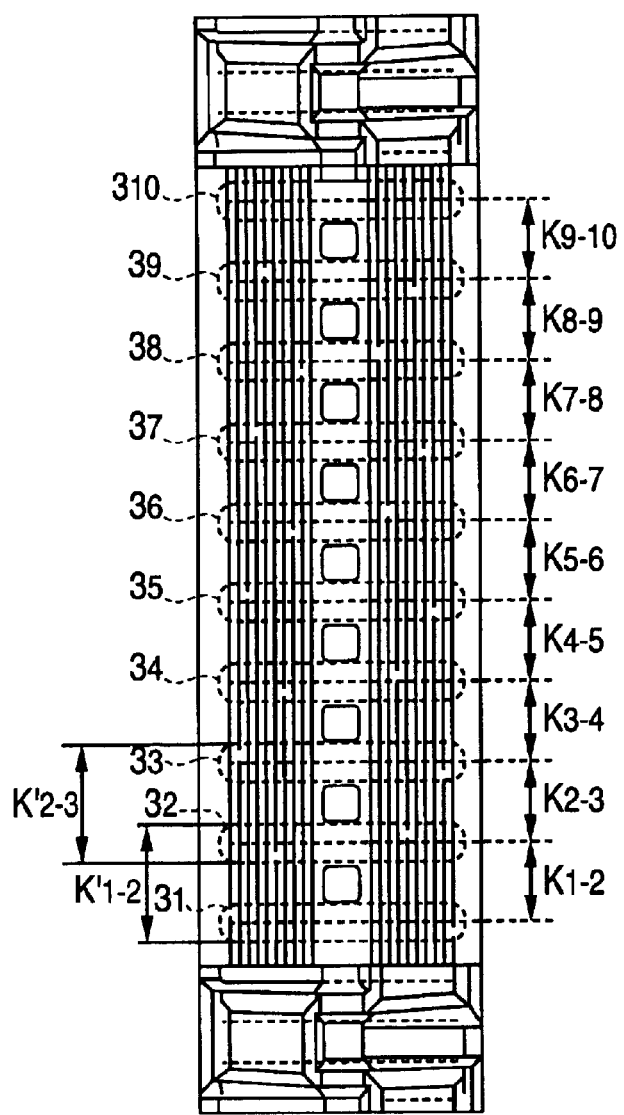
FIG. 19 is a partial plan view, with a portion removed, of a fourth example of the invention.
Figure 20:
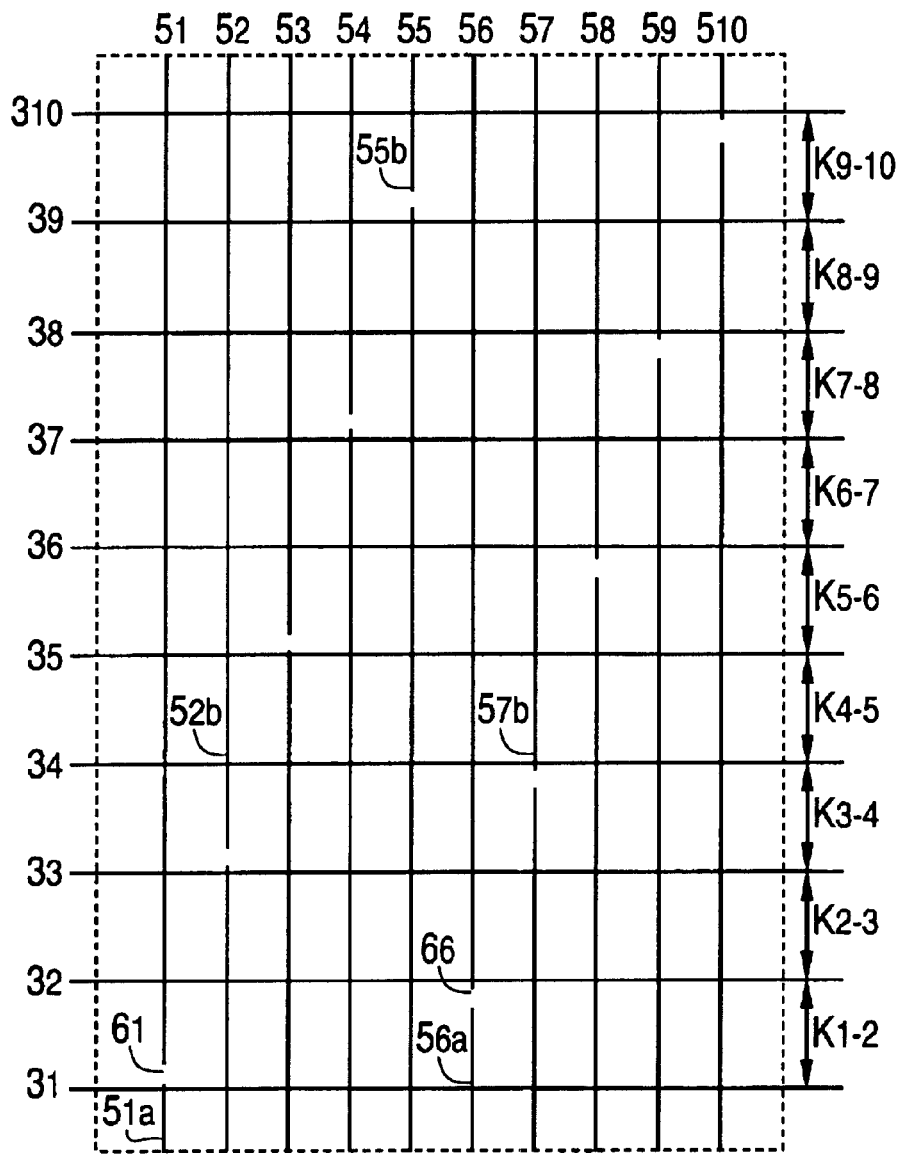
FIG. 20 is an explanatory view showing an arrangement of butt portions of steel cords of the fourth example in FIG. 19.

FIG. 19 is a partial plan view showing an arrangement of the butt portions 6 of the connecting section of the steel cords 5 of the fourth example of the invention. FIG. 20 is an explanatory view showing an arrangement of the steel cords 5 in FIG. 19.

Though this example is an example of a combination arrangement with four-shift lapping, as is the third example, the positions of the butt portions 6 of the steel cords 5 are not arranged in the same line in the width direction of the rubber crawler 1.

In ten steel cords 5 of the steel cord rows sandwiching the engaging holes 9 from one side, the number of cords 5 having butt portions 6 within a space (K) from the middle of one core bar 3 (the width of the circumferential direction of the rubber crawler) to the middle of an adjoining core bar 3 (within one interval between core bars) is made to be 25% or less of the number of all the steel cords 5 on that one side.

The number of butt portions 6 within a space ($K_{1-2}$) from the middle of the core bar $3_1$ to the middle of the adjoining core bar $3_2$ is two, which are the butt portion $6_1$ of the steel cord $5_1$ and the butt portion $6_6$ of the steel cord $5_6$. These two steel cords $5_1a$, $5_6a$ do not overlap at all with the portions $5_2b$, $5_5b$, $5_7b$ of the adjoining steel cords extending from the opposite direction, in the circumferential direction of the rubber crawler 1. However, in this case, since the ratio of cords having butt portions in this interval (2) to all of the steel cords (10) is 20%, trouble does not occur especially.

In addition, there are no butt portions within the space ($K_{2-3}$) from the middle of the core bar $3_2$ to the middle of the adjoining core bar 33, and therefore, the ratio of cords having butt portions in the interval (o) to all of the steel cords (10) is 0%.

The ratios in spaces $K_{3-4}$, $K_{4-5}$, $K_{5-6}$, $K_{6-7}$, $K_{7-8}$, $K_{8-9}$ and $K_{9-10}$ are 20%, 0%, 20%, 0%, 20%, 0% and 20%, respectively. The ratios are all set to be 25% or less.

In this case, it is desirable that the range in which the non-lapping steel cords are arranged so as to be 25% or less of all the steel cords 5 is formed by a space including the space between two core bars 3 and the projections of the core bars 3 in a direction perpendicular to the planes of the core bars (for example, the space $K'_{1-2}$, the space $K'_{2-3}$). In this example, the arrangement of the butt portions 6 also satisfies this condition.

Figure 21:
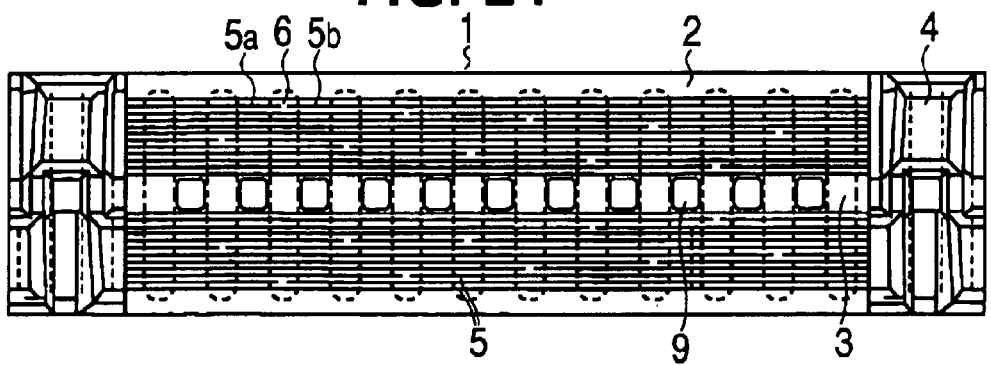
FIG. 21 is a partial plan view, with a portion removed, of a fifth example of the invention.

FIG. 21 is a partial plan view showing an arrangement of the butt portions 6 of the connecting section of the steel cords 5 of a fifth example of the invention. This example is an example showing an arrangement combining the butt portions 6 with five-shift lapping.

Figure 22:
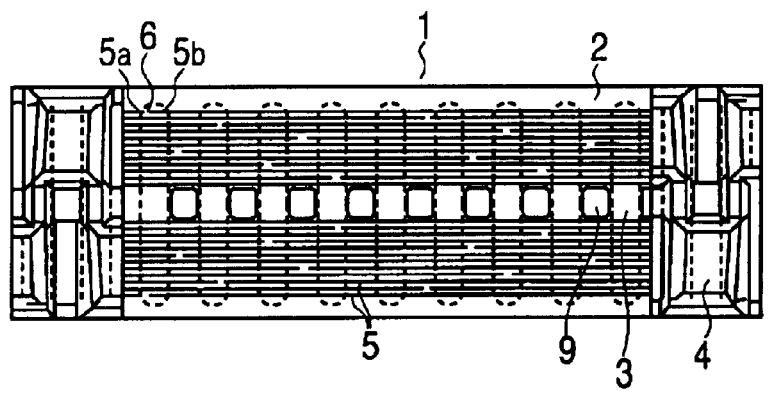
FIG. 22 is a partial plan view, with a portion removed, of a sixth example of the invention.
Figure 23:
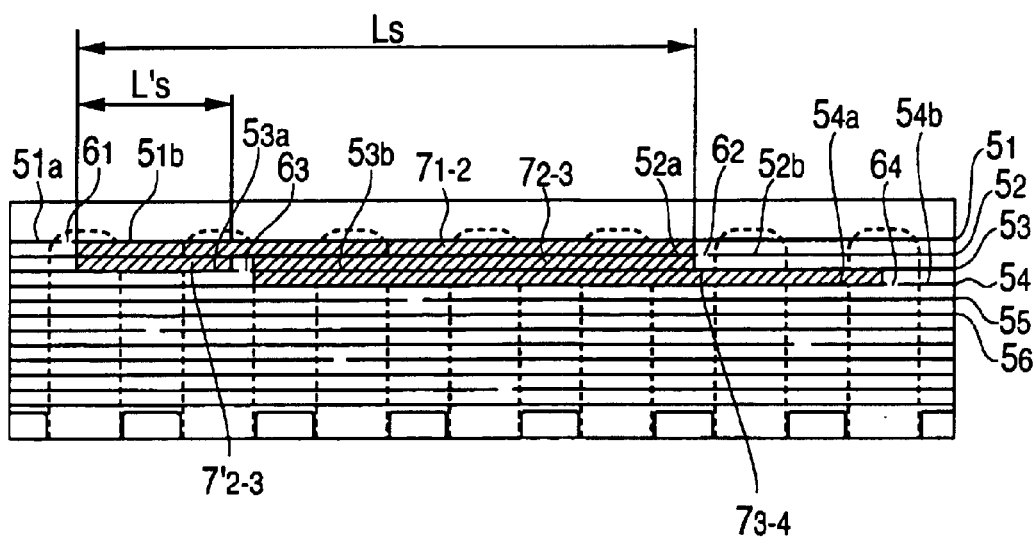
FIG. 23 is an explanatory view showing an arrangement of butt portions of steel cords of the sixth example in FIG. 22.

FIG. 22 is a partial plan view showing an arrangement of the butt portions 6 of the connecting section of the tensile strength bodies of the sixth example of the invention. FIG. 23 is an explanatory view for explaining the arrangement of the tensile strength bodies in FIG. 22, and shows an example of an arrangement combining the butt portions with one-shift lapping.

In these figures, the positions of the butt portions $6_1$, $6_2$ of the adjoining steel cords $5_1$, $5_2$ are shifted along the circumferential direction. The end $5_1b$ of the steel cord $5_1$ and the end $5_2a$ of the steel cord $5_2$ overlap each other along the circumferential direction, and are bonded to each other through adhesive rubber $7_{1-2}$.

Besides, the end $5_2a$ of the steel cord $5_2$ and the end $5_3b$ of the steel cord $5_3$ overlap each other along the circumferential direction, and are bonded to each other through adhesive rubber $7_{-2-3}$.

The end $5_3a$ of the steel cord $5_3$ does not overlap with the end $5_2b$ of the steel cord $5_2$ and the end $5_4b$ of the steel cord $5_4$ extending from the opposite direction of the adjoining steel cords.

However, the end $5_3a$ of the steel cord $5_3$ is bonded to the end $5_2a$ of the steel cord $5_2$ through adhesive rubber $7'_{2-3}$. Therefore, if the circumference $L_S'$ between the end $5_3a$ of the steel cord $5_3$ and the end $5_1b$ of the steel cord $5_1$ is the length with the pulling strength corresponding to the tensile strength of the steel cord 5, a sufficient connecting efficiency can be obtained. The connecting efficiency is 83% in the one-shift lapping method of FIG. 22, and therefore, the connecting method is useful, without special difficulties.

Figure 24:
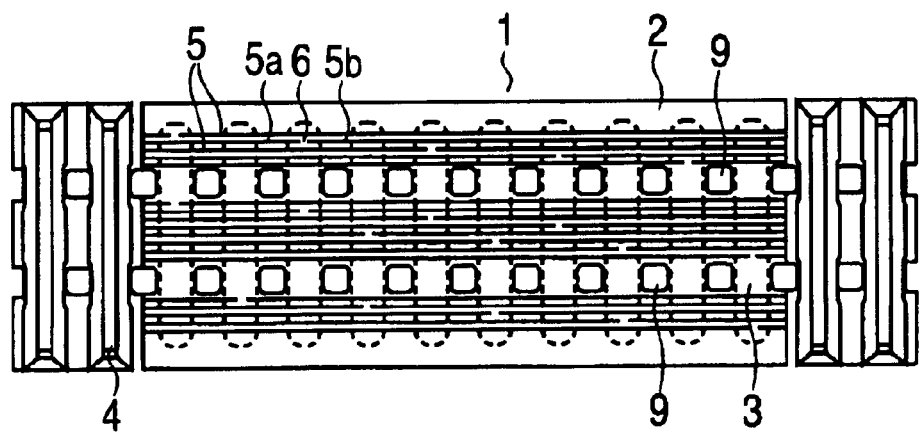
FIG. 24 is a partial plan view, with a portion removed, of a seventh example of the invention.

FIG. 24 shows the seventh example of the invention, which is a partial plan view of an arrangement of the butt portions of the connecting sections of the steel cords 5.

The rubber crawler 1 of the seventh example arranges pluralities of steel cords 5 as three rows of tensile strength bodies widthwise across the rubber crawler 1. In this case, the positions of the butt portions 6 of each steel cord 5 is shifted longitudinally circumferentially of the rubber crawler with respect to the positions of the butt portions 6 of the adjoining steel cords 5.

Figure 25:
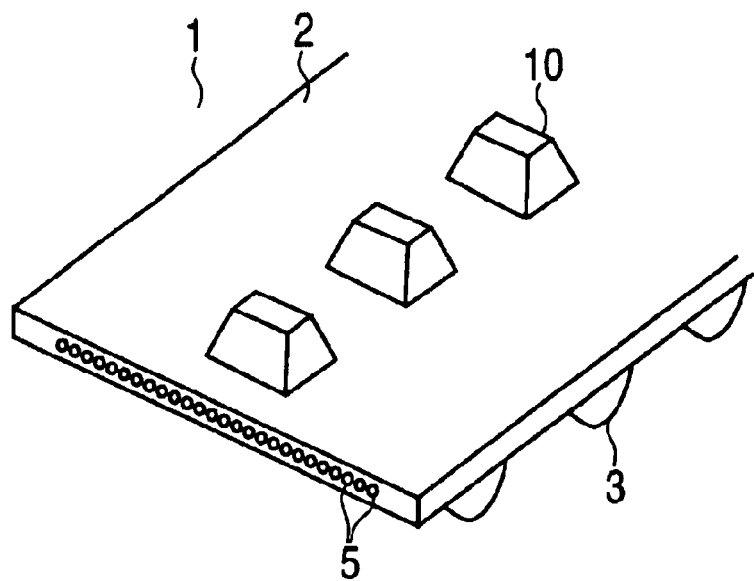
FIG. 25 is a perspective view of an eighth example of the invention.
Figure 26A:
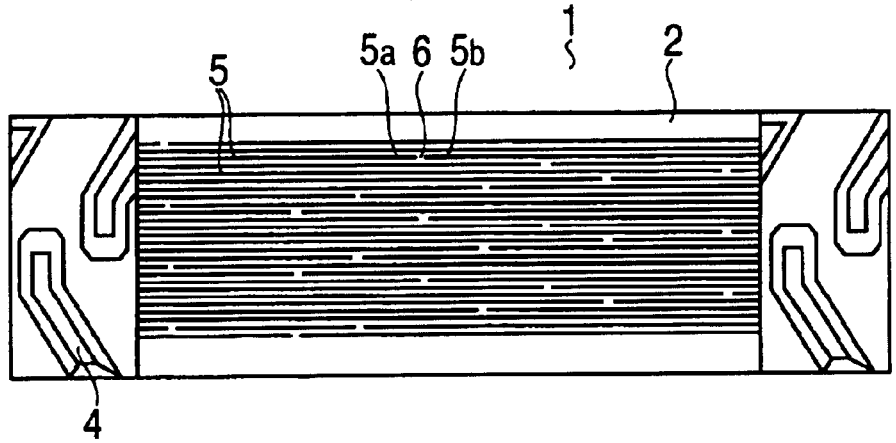
FIG. 26A is a partial plan view, with a portion removed, of the eighth example in FIG. 25.

FIG. 25 shows the eighth example of the invention, which is a perspective view of the rubber crawler 1 using an arrangement of the butt portions 6 of the connecting section of the steel cords 5. FIG. 26A is a partial plan view of an arrangement of the butt portions of the connecting sections of the steel cords 5, wherein pluralities of steel cords 5 are arranged as one row of tensile strength bodies widthwise across the rubber crawler 1. Besides, the rubber crawler 1 of the eighth example is a core-bar-less rubber crawler in which no core bars 3 are embedded into the main body of the rubber crawler 1.

Figure 26B:
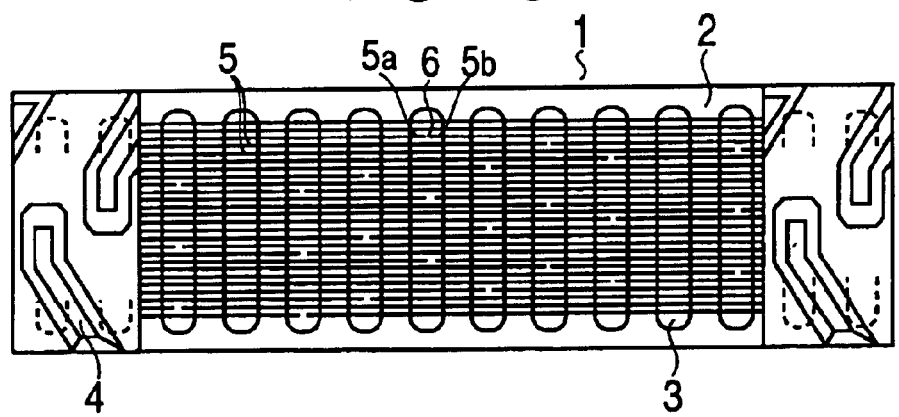
FIG. 26B is a partial plan view of the eighth example in FIG. 25 showing core bars embedded.

FIG. 26B is a partial plan view showing another example of the eighth example shown in FIG. 26A, wherein the core bars 3 are embedded into the main body of the rubber crawler 1 of the eighth example.

Figure 27:
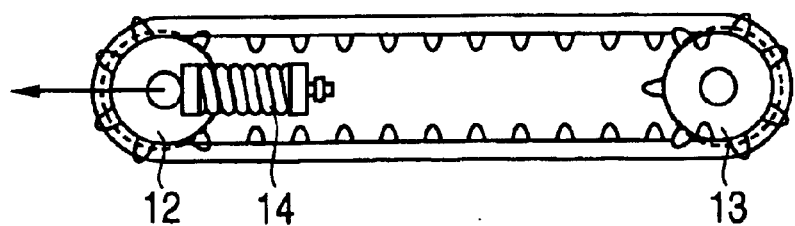
FIG. 27 is a side view showing a bending tester.
Figure 28:
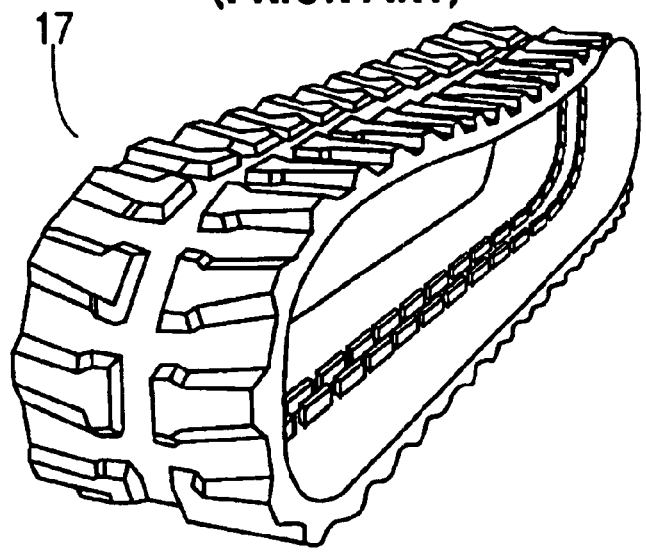
FIG. 28 is a perspective view showing an example of a conventional rubber crawler.
Figure 29:
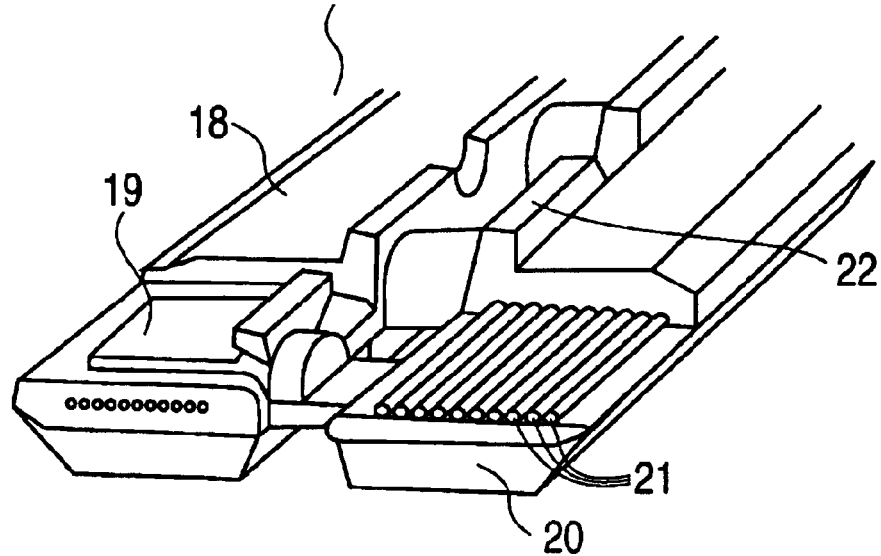
FIG. 29 is a sectional perspective view in important part showing an example thereof.
Figure 30:
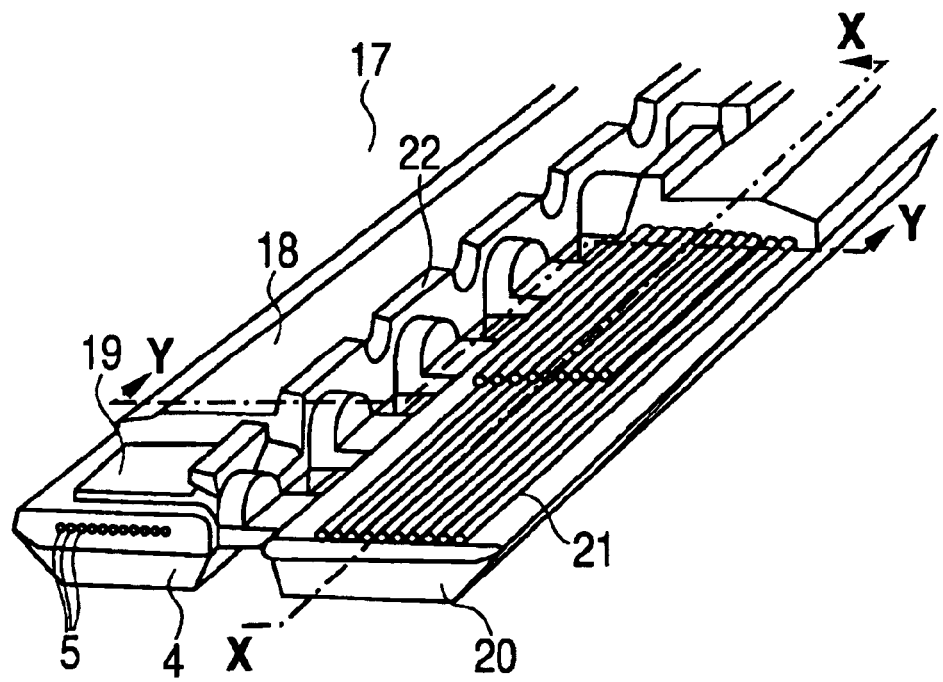
FIG. 30 is a perspective view in important part showing a connecting section of a conventional rubber crawler by an end overlapping method.
Figure 31:
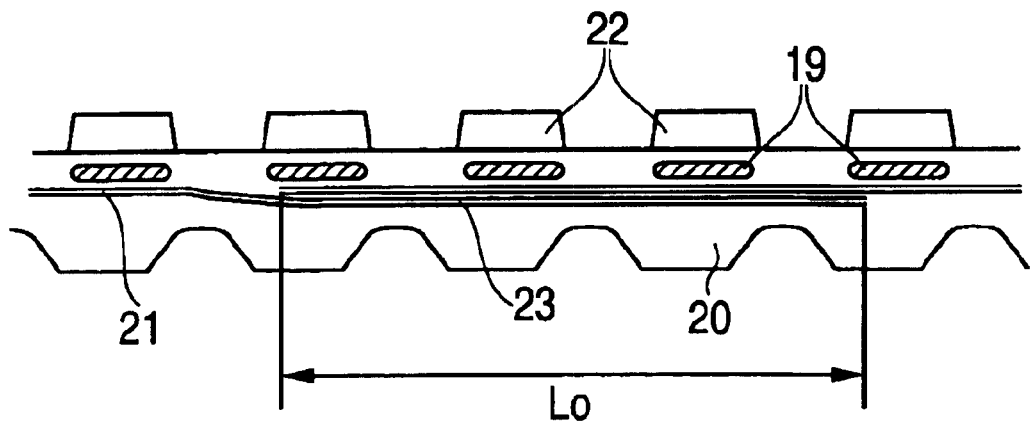
FIG. 31 is a sectional view taken on line X—X.
Figure 32:
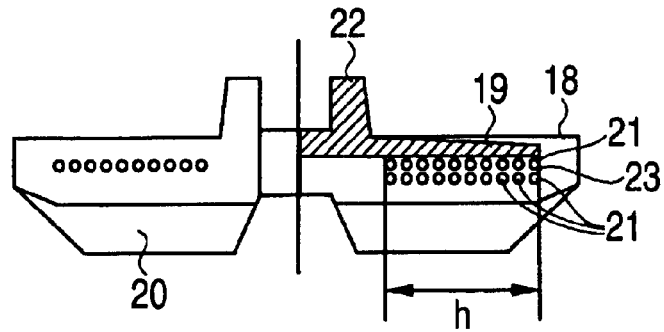
FIG. 32 is a sectional view taken on line Y—Y.

The rubber crawler by the steel cord connecting method of the invention and the rubber crawler by the conventional overlapping method were respectively mounted on a bending tester of FIG. 27, and a bending fatigue test was carried out. FIG. 35 is a diagram showing the test results and the methods of the rubber crawlers used in the bending fatigue test.

The bending test is carried out by mounting the rubber crawler on an eccentric sprocket and a driving sprocket of the bending tester and setting a spring so that 14.7 kN of tension is added to the rubber crawler. In this case, the bottom diameter of both the eccentric sprocket and the driving sprocket is 224 mm.

As shown in FIG. 35, in the conventional rubber crawler, 165 mm separated from the front ends of the steel cords on the periphery side (treat side) among the belt-shaped overlapped steel cords by bending 560,000 times (970,000 tension loads. However, in the rubber crawler based on the invention, though 5,720,000 bending cycles (9,880,000 tension loads) were carried out, there was no problem. Here, the rubber crawler of the invention has a durability of 10 times or more the durability of the conventional one.

Furthermore, the invention can be carried out as follows.

(1) In the example in which the tensile strength bodies are divided into two along the engaging part of the middle of the rubber crawler, which two rows of tensile strength bodies are embedded in the rubber crawler, it is possible to arrange the butt portions of the tensile strength bodies in the connecting section of the right and left tensile strength body rows so as to be different on the right from on the left, as well as having the bilateral-symmetry arrangement shown in the first example and the right and left same arrangement shown in the second example.

(2) Though the front edges of opposite ends of a tensile strength body are abutted against each other and connected together into an endless form in the above-mentioned examples, two or more tensile strength bodies may be connected based on the invention. In this case, two or more connecting sections are formed.

(3) The core bars embedded in the rubber crawler may be made from high molecular resin as well as metal. The material of a core bar is suitably chosen in consideration of the required durability and economical efficiency. Besides, core-bar-less rubber crawler in which no core bars are embedded may be used.

(4) It is possible to divide the tensile strength body rows into three rows or more and to embed them in a rubber crawler, as well as the two rows of tensile strength bodies or the one row of the tensile strength body in the above-mentioned examples. Here, the one row of tensile strength body is mostly used in a rubber crawler with no engaging hole for a driving protrusion provided in the inner circumferential side, and is embedded in the widthwise, middle, widthwise, of the rubber crawler.

Since the present invention has the above-mentioned construction, even in a sprocket and an idler winding section, there is no place in which big shearing deformation occurs such as occurs in the connecting section of the tensile strength bodies made with the conventional overlapping method. Accordingly, even if unusual tension is added, the connecting section of the tensile strength bodies may not be destroyed easily. Therefore, the connecting section improves in durability, thereby forming a reliable rubber crawler.

Besides, while the connecting section length is restricted, the shift lapping length of the tensile strength body is designed so that the total pulling strength of all the tensile strength bodies may be more than 80% of the difference between the total tensile strength of all the tensile strength bodies and the total tensile strength of tensile strength bodies having butt portions 6 within the predetermined interval of core bars. Therefore, a practical and efficient connection is achieved, and a durable rubber crawler can be gained.

Moreover, since the position of one of the butt portions of the individual tensile strength bodies is shifted along the circumferential direction of the rubber crawler so as not to be in alignment with the positions of the butt portions of the other tensile strength bodies, the durability-inferior butt portions do not concentrate in one place. Therefore, the connecting section can improve in durability.

In the configuration in which the number of tensile strength bodies not overlapping with the tensile strength bodies extending from the opposite direction of the circumferential direction of the rubber crawler of the adjoining right and left tensile strength bodies are not concentratively arranged over does not constitute more than 25% of the number of all the tensile strength bodies, it is not necessary to compensate the shortage of strength by increasing the number of tensile strength bodies or by, using tensile strength bodies with high breaking strength. Therefore, cost can be held down and the connecting section can have improved durability.

Furthermore, in the configuration in which the positions of the butt portions of the tensile strength bodies in projection of a lug or a core bar in a direction perpendicular to the plane of the lug or core bar, the ends of the tensile strength bodies are prevented from breaking through the rubber elastic body on the tread side. Therefore, the rubber crawler can improve in durability.

What is claimed is:

1. A rubber crawler, comprising:
    a rubber elastic body having lugs, said lugs being embedded in an outer peripheral side of the rubber elastic body and positioned at intervals along a circumferential direction of the rubber crawler;
    metallic core bars embedded in the rubber elastic body at intervals along the circumferential direction of the rubber crawler; and
    a plurality of parallel tensile strength bodies embedded in the outer peripheral side of the rubber elastic body, peripherally outside the core bars, said tensile strength bodies extending in the circumferential direction of the rubber crawler and forming one or more rows of tensile strength bodies in a width direction of the rubber crawler, each of said tensile strength bodies having a butt portion, each of said one or more rows of tensile strength bodies being endless as a whole by shifting the butt portions of at least 80% of the tensile strength bodies forming each row longitudinally with respect to the butt portions of adjoining tensile strength bodies, and the butt portions of more than 75% of the tensile strength bodies being positioned within a projection of the core bars in a direction perpendicular to the plane of the core bars.

2. A rubber crawler as claimed in claim 1, wherein the plurality of tensile strength bodies is divided, in a width direction of the rubber crawler, into three rows of tensile strength bodies.

3. A rubber crawler as claimed in claim 1, wherein each of the butt portions of the tensile strength bodies forming each row is shifted longitudinally with respect to the butt portions of adjoining tensile strength bodies.

4. A rubber crawler as claimed in claim 1, wherein less than 40% of the tensile strength bodies forming each row have butt portions positioned within a fixed interval between adjacent core bars in the circumferential direction of the rubber crawler.

5. A rubber crawler as claimed in claim 1, wherein the butt portions of the tensile strength bodies forming each row are positioned within planes of projection of the core bars or within planes of projection of the lugs.

6. A rubber crawler, comprising:
   a rubber elastic body having lugs, said lugs being embedded in an outer peripheral side of the rubber elastic body and positioned at intervals along a circumferential direction of the rubber crawler;
   metallic core bars embedded in the rubber elastic body at intervals along the circumferential direction of the rubber crawler; and
   a plurality of parallel tensile strength bodies embedded in the outer peripheral side of the rubber elastic body, peripherally outside the core bars, said tensile strength bodies extending in the circumferential direction of the rubber crawler and being divided into two rows of tensile strength bodies in a width direction of the rubber crawler, each of said tensile strength bodies having a butt portion, each of said rows of tensile strength bodies being endless as a whole by shifting the butt portions of at least 80% of the tensile strength bodies forming each row longitudinally with respect to the butt portions of adjoining tensile strength bodies, and the butt portions of more than 75% of the tensile strength bodies being positioned within a projection of the core bars in a direction perpendicular to the plane of the core bars.

7. A rubber crawler as claimed in claim 6, wherein each of the butt portions of the tensile strength bodies forming each row is shifted longitudinally with respect to the butt portions of adjoining tensile strength bodies.

8. A rubber crawler as claimed in claim 6, wherein less than 40% of the tensile strength bodies forming each row have butt portions positioned within a fixed interval between adjacent core bars in the circumferential direction of the rubber crawler.

9. A rubber crawler as claimed in claim 6, wherein the butt portions of the tensile strength bodies forming each row are positioned within planes of projection of the core bars or within planes of projection of the lugs.

10. A rubber crawler, comprising:
    a rubber elastic body having lugs, said lugs being embedded in an outer peripheral side of the rubber elastic body and positioned at intervals along a circumferential direction of the rubber crawler;
    metallic core bars embedded in the rubber elastic body at intervals along the circumferential direction of the rubber crawler, and a plurality of parallel tensile strength bodies embedded in the outer peripheral side of the rubber elastic body, peripherally outside the core bars, said tensile strength bodies extending in the circumferential direction of the rubber crawler and forming one or more rows of tensile strength bodies in a width direction of the rubber crawler, each of said tensile strength bodies having a butt portion, each of said one or more rows of tensile strength bodies being endless as a whole by shifting the butt portions of at least 80% of the tensile strength bodies forming each row longitudinally with respect to the butt portions of adjoining tensile strength bodies, and the butt portions of less than 25% of the tensile strength bodies being positioned within intervals between adjacent core bars in the circumferential direction of the rubber crawler.

* * * * *